Aug. 5, 1952 W. JOSSELYN 2,605,543
CUTTING PLIERS
Filed Dec. 3, 1946
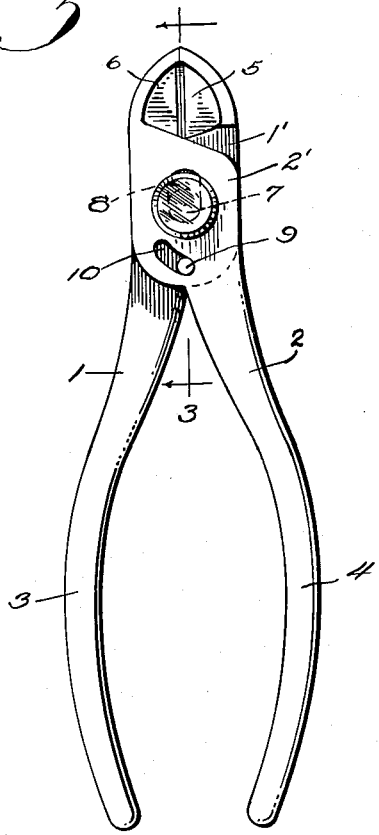
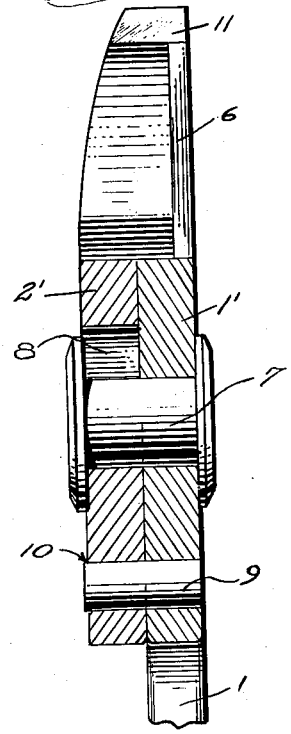
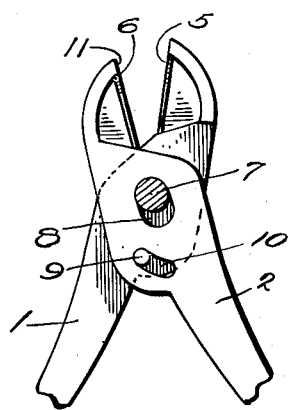
INVENTOR.
Winsor Josselyn
BY
W. J. Eccleston,
ATTORNEY Patented Aug. 5, 1952

UNITED STATES PATENT OFFICE 2,605,543

CUTTING PLIERS

Winsor Josselyn, San Diego, Calif.

Application December 3, 1946, Serial No. 713,726

1 Claim. (Cl. 30—181)

(Granted under the act of March 3, 1883, as amended April 30, 1928; 370 O. G. 757)

The invention described herein, if patented, may be manufactured and used by or for the Government for governmental purposes, without the payment to me of any royalty thereon.

My invention relates to improvements in cutting tools having crossed members pivotally secured together, each member being provided with a cutting jaw on the forward end and a handle extending rearwardly therefrom.

One object of my invention is to provide an extremely simple, sturdy construction of cutting tool or nipper in which one of the jaws moves longitudinally with respect to the other while the jaws are being closed, thereby facilitating the cutting action of the tool and reducing the amount of manual pressure needed for its operation.

A further object of my invention is to provide a cutting tool or nipper in which a shearing action is imparted to the jaws while retaining the advantage of pivoting the jaws centrally.

I am aware that prior to my invention cutting tools have been made having a shearing as well as a cutting action. However, these tools have been of complicated construction and have relied for shearing action upon positioning the pivot out of alignment with the cutting edges of the jaws. Such a construction is distinctly inferior to my invention since it sacrifices the advantage of direct transmission of force present in centrally pivoted cutters, requires greater manual pressure by the operator to perform an equal task, and subjects the pivot to unnecessary strain.

In the accompanying drawing:

Fig. 1 is a plan view of the cutting tool.

Fig. 2 is a fragmentary plan view of the cutting tool, partly in section, showing the same in open position; and Fig. 3 is an enlarged sectional view taken along line 3—3 of Fig. 1.

Similar numerals refer to similar parts throughout the several views.

Cross members 1 and 2 of my cutting tool may be of conventional design and are respectively provided with handles 3 and 4 at their lower ends and with cutting jaws 5 and 6 at their upper ends. Each of these members 1 and 2 is provided with an enlargement or boss 1' and 2' respectively, disposed adjacent the cutting jaws 5 and 6. The enlargement 1' is provided with a fixed pintle 7 adapted to engage in a longitudinally extending slot 8 provided in enlargement 2'. Cooperation of pintle 7 with slot 8 permits members 1 and 2 to be moved both pivotally and longitudinally. The enlargement 1' is further provided with a fixed pin 9 positioned below pintle 7 which is adapted to engage in an arcuate slot 10 provided in enlargement 2', which slot curves upwardly and sidewise from a point below longitudinal slot 8. The camming action of pin 9 in arcuate slot 10 will cause the jaws 5 and 6 to move longitudinally of one another as they move toward the closed position. The free ends of the cutting jaws 5 and 6 are provided with abutments 11 which serve to limit the movements of the jaws toward each other at each cutting operation.

In operation, an article placed between the jaws of my cutting tool will be subjected to a shearing as well as to a cutting action as the jaws come together, while the force exerted at the handle ends of the cross members will be directly transmitted through the centrally positioned pivot to the cutter jaws with a minimum loss of energy and a minimum strain on the pivot.

It is obvious that various changes and modifications may be made in the details of construction and design of the above specifically described embodiment of this invention without materially departing from the spirit thereof, such changes and modifications being within the scope of my invention, which is restricted only by the following claim.

I claim:

A nipper having a pair of members pivoted intermediate their ends, each of said members having a jaw portion at one end and a handle portion at the other end, said jaw members being provided with rectilinear knife edges adapted to abut when the jaws are in closed position, the pivoting means between said members consisting of a pintle carried by one of the members received in a longitudinal slot in the other member in line with the knife edges on said jaws, abutments on said jaws in line with said knife edges adapted to abut when the nipper is in closed position, and a pin on said member carrying said pintle and received in a curved slot on the other member adapted to move the members relative to each other to cause the knife edges to produce a draw cutting action during their cutting movement.

WINSOR JOSSELYN.

REFERENCES CITED

The following references are of record in the file of this patent:

UNITED STATES PATENTS

| Number | Name | Date |
|---|---|---|
| 213,758 | Kellar | Apr. 1, 1879 |
| 314,255 | Manchester | Mar. 24, 1885 |
| 341,957 | Smith | May 18, 1886 |
| 460,704 | Hansen | Oct. 6, 1891 |
| 467,025 | Wreden | Jan. 12, 1892 |
| 556,644 | Rivard et al. | Mar. 17, 1896 |
| 884,281 | Lindal | Apr. 7, 1908 |
| 953,365 | Wheeler | Mar. 29, 1910 |
| 1,048,753 | Von den Steinen | Dec. 31, 1912 |
| 1,428,276 | Daniels | Sept. 5, 1922 |
| 1,862,556 | Welhaven | June 14, 1932 |
| 2,207,994 | Trapp | July 16, 1940 |
| 2,227,531 | Cantrell | Jan. 7, 1941 |
| 2,495,677 | Boyer | Jan. 24, 1950 |

FOREIGN PATENTS

| Number | Country | Date |
|---|---|---|
| 3 693 | Great Britain | May 13, 1893 |